(12) United States Patent
Lisseman et al.

(10) Patent No.: US 8,983,732 B2
(45) Date of Patent: Mar. 17, 2015

(54) STEERING WHEEL WITH HAND PRESSURE SENSING

(75) Inventors: Jason Lisseman, Shelby Township, MI (US); David Andrews, Ortonville, MI (US); Jerome Bosch, Romeo, MI (US)

(73) Assignee: TK Holdings Inc., Auburn Hills, MI (US)

( * ) Notice: Subject to any disclaimer, the term of this patent is extended or adjusted under 35 U.S.C. 154(b) by 60 days.

(21) Appl. No.: 13/078,793

(22) Filed: Apr. 1, 2011

(65) Prior Publication Data

US 2011/0246028 A1 Oct. 6, 2011

Related U.S. Application Data

(60) Provisional application No. 61/320,588, filed on Apr. 2, 2010.

(51) Int. Cl.
| | |
|---|---|
| *B60R 22/00* | (2006.01) |
| *E05F 15/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B62D 1/04* | (2006.01) |
| *B60K 28/06* | (2006.01) |
| *B62D 1/06* | (2006.01) |

(52) U.S. Cl.
CPC .............. *B62D 1/046* (2013.01); *B60K 28/066* (2013.01); *B62D 1/065* (2013.01)
USPC .......................................................... 701/45

(58) Field of Classification Search
CPC ..................................................... B60W 50/14
USPC ............................................................ 701/45
See application file for complete search history.

(56) References Cited

U.S. PATENT DOCUMENTS

| | | | | |
|---|---|---|---|---|
| 3,585,626 | A | * | 6/1971 | Tartarini ...................... 180/272 |
| 4,268,815 | A | | 5/1981 | Eventoff et al. |

(Continued)

FOREIGN PATENT DOCUMENTS

| | | |
|---|---|---|
| DE | 60011078 T2 | 6/2005 |
| DE | 60210951 T2 | 1/2007 |

(Continued)

OTHER PUBLICATIONS

Office Action, dated Nov. 4, 2014, received in connection with JP Application No. 2011-082736. (English Translation).
Official Office Action, dated Sep. 11, 2014, in related U.S. Appl. No. 13/076,226.

(Continued)

*Primary Examiner* — Khoi Tran
*Assistant Examiner* — Harry Oh
(74) *Attorney, Agent, or Firm* — Meunier Carlin & Curfman, LLC

(57) ABSTRACT

The invention relates to a vehicle safety system includes a steering wheel, a plurality of pressure sensitive sensors located in the steering wheel, and a control unit. The pressure sensitive sensors can be located in different regions of the steering wheel. The pressure sensitive sensors can determine if a driver's hand is pressing upon a respective region of the steering wheel associated with one or more of the plurality of pressure sensitive sensors. The control unit can be configured or programmed to determine if at least one of the driver's hands is pressing upon a region of the steering wheel for a predetermined amount of time.

16 Claims, 5 Drawing Sheets

(56) References Cited

U.S. PATENT DOCUMENTS

| | | | |
|---|---|---|---|
| 4,276,538 A | 6/1981 | Eventoff et al. | |
| 4,301,337 A | 11/1981 | Eventoff | |
| 4,314,227 A | 2/1982 | Eventoff | |
| 4,314,228 A | 2/1982 | Eventoff | |
| 4,315,238 A | 2/1982 | Eventoff | |
| 4,451,714 A | 5/1984 | Eventoff | |
| 4,489,302 A | 12/1984 | Eventoff | |
| 4,540,979 A | 9/1985 | Gerger | |
| 4,739,299 A | 4/1988 | Eventoff et al. | |
| 4,810,992 A | 3/1989 | Eventoff | |
| 4,963,702 A | 10/1990 | Yaniger et al. | |
| 5,053,585 A | 10/1991 | Yaniger | |
| 5,296,837 A | 3/1994 | Yaniger | |
| 5,302,936 A | 4/1994 | Yaniger | |
| 5,365,671 A | 11/1994 | Yaniger | |
| 5,398,962 A | 3/1995 | Kropp | |
| 5,423,569 A | 6/1995 | Reighard et al. | |
| 5,463,258 A | 10/1995 | Filion et al. | |
| 5,510,783 A | 4/1996 | Findlater et al. | |
| 5,539,259 A | 7/1996 | Filion et al. | |
| 5,659,334 A | 8/1997 | Yaniger et al. | |
| 5,670,988 A | 9/1997 | Tickle | |
| 5,828,363 A | 10/1998 | Yaniger et al. | |
| 5,847,639 A | 12/1998 | Yaniger | |
| 5,907,419 A | 5/1999 | Martnelli et al. | |
| 5,943,044 A | 8/1999 | Martinelli et al. | |
| 5,965,952 A | 10/1999 | Podoloff et al. | |
| 5,982,519 A | 11/1999 | Martnelli et al. | |
| 6,016,103 A * | 1/2000 | Leavitt | 340/575 |
| 6,084,572 A | 7/2000 | Yaniger | |
| 6,172,610 B1 * | 1/2001 | Prus | 340/575 |
| 6,239,790 B1 | 5/2001 | Martinelli et al. | |
| 6,291,568 B1 | 9/2001 | Lussey | |
| 6,396,523 B1 | 5/2002 | Segal et al. | |
| 6,495,069 B1 | 12/2002 | Lussey et al. | |
| 6,538,643 B2 | 3/2003 | Mori et al. | |
| 6,590,499 B1 * | 7/2003 | D'Agosto | 340/575 |
| 6,646,540 B1 | 11/2003 | Lussey | |
| 6,661,345 B1 * | 12/2003 | Bevan et al. | 340/575 |
| 6,750,803 B2 | 6/2004 | Yates et al. | |
| 6,758,689 B1 | 7/2004 | Bair et al. | |
| 6,765,557 B1 | 7/2004 | Segal et al. | |
| 6,820,804 B2 | 11/2004 | Segal et al. | |
| 6,850,221 B1 | 2/2005 | Tickle | |
| 6,861,961 B2 | 3/2005 | Sandbach et al. | |
| 6,906,700 B1 | 6/2005 | Armstrong | |
| 6,909,354 B2 | 6/2005 | Baker et al. | |
| 6,947,031 B2 | 9/2005 | Sandbach et al. | |
| 7,050,045 B2 | 5/2006 | Baker et al. | |
| 7,113,179 B2 | 9/2006 | Baker et al. | |
| 7,176,889 B2 | 2/2007 | Baker et al. | |
| 7,213,323 B2 | 5/2007 | Baker et al. | |
| 7,301,435 B2 | 11/2007 | Lussey et al. | |
| 7,310,089 B2 | 12/2007 | Baker et al. | |
| 7,377,133 B2 | 5/2008 | Sandbach et al. | |
| 7,554,045 B2 | 6/2009 | Sandbach et al. | |
| 7,554,051 B2 | 6/2009 | Crispin | |
| 7,554,531 B2 | 6/2009 | Baker et al. | |
| 7,573,464 B2 | 8/2009 | Baker et al. | |
| 7,603,917 B2 | 10/2009 | Graham et al. | |
| 7,649,278 B2 | 1/2010 | Yoshida et al. | |
| 7,688,213 B2 * | 3/2010 | Power | 340/575 |
| 7,772,960 B2 | 8/2010 | Baker | |
| 7,791,596 B2 | 9/2010 | Errico et al. | |
| 7,830,265 B2 * | 11/2010 | Power | 340/575 |
| 8,049,731 B2 | 11/2011 | Baker et al. | |
| 8,269,731 B2 | 9/2012 | Molne | |
| 2001/0040551 A1 | 11/2001 | Yates et al. | |
| 2002/0054060 A1 | 5/2002 | Schena | |
| 2002/0097229 A1 | 7/2002 | Rose et al. | |
| 2002/0135457 A1 | 9/2002 | Sandbach et al. | |
| 2003/0011576 A1 | 1/2003 | Sandbach et al. | |
| 2003/0043014 A1 | 3/2003 | Nakazawa et al. | |
| 2003/0074092 A1 * | 4/2003 | Carrabis | 700/90 |
| 2003/0076968 A1 | 4/2003 | Rast | |
| 2003/0083131 A1 | 5/2003 | Armstrong | |
| 2004/0071471 A1 | 4/2004 | Baker et al. | |
| 2004/0212189 A1 * | 10/2004 | Kachu | 280/807 |
| 2004/0217331 A1 | 11/2004 | Lussey et al. | |
| 2004/0252007 A1 | 12/2004 | Lussey et al. | |
| 2005/0067889 A1 | 3/2005 | Chernoff et al. | |
| 2006/0028454 A1 | 2/2006 | Branton et al. | |
| 2006/0054479 A1 | 3/2006 | Iisaka et al. | |
| 2006/0113880 A1 | 6/2006 | Pei et al. | |
| 2006/0255903 A1 | 11/2006 | Lussey et al. | |
| 2007/0056493 A1 | 3/2007 | Burkitt et al. | |
| 2007/0062753 A1 | 3/2007 | Yoshida et al. | |
| 2007/0132736 A1 | 6/2007 | Crispin | |
| 2007/0141939 A1 | 6/2007 | Sandbach et al. | |
| 2007/0146313 A1 | 6/2007 | Newman et al. | |
| 2007/0176902 A1 | 8/2007 | Newman et al. | |
| 2007/0289859 A1 | 12/2007 | Sandbach et al. | |
| 2008/0024438 A1 | 1/2008 | Collins et al. | |
| 2008/0042856 A1 * | 2/2008 | Power | 340/575 |
| 2008/0264183 A1 | 10/2008 | Graham et al. | |
| 2008/0289886 A1 | 11/2008 | Burkitt | |
| 2009/0151447 A1 | 6/2009 | Jin et al. | |
| 2009/0241378 A1 | 10/2009 | Ellis | |
| 2009/0249191 A1 | 10/2009 | Leoutsarakos et al. | |
| 2009/0279811 A1 | 11/2009 | Kilburn et al. | |
| 2010/0045612 A1 | 2/2010 | Molne | |
| 2010/0062148 A1 | 3/2010 | Lussey et al. | |
| 2010/0102922 A1 | 4/2010 | Walkington | |
| 2010/0102972 A1 * | 4/2010 | Middlekauff et al. | 340/576 |
| 2010/0126840 A1 | 5/2010 | Walkington | |
| 2010/0130808 A1 * | 5/2010 | Hattori | 600/9 |
| 2010/0168998 A1 | 7/2010 | Matsunaga | |
| 2010/0283749 A1 | 11/2010 | Walkington | |
| 2011/0037721 A1 | 2/2011 | Cranfill | |
| 2011/0054359 A1 | 3/2011 | Sazonov et al. | |
| 2011/0175844 A1 | 7/2011 | Berggren | |
| 2011/0187674 A1 | 8/2011 | Baker et al. | |
| 2011/0210926 A1 | 9/2011 | Pasquero et al. | |
| 2011/0216015 A1 | 9/2011 | Edwards | |
| 2011/0245992 A1 | 10/2011 | St hlin et al. | |
| 2011/0253948 A1 | 10/2011 | Lussey et al. | |
| 2011/0290038 A1 | 12/2011 | Hoshino et al. | |
| 2012/0179328 A1 * | 7/2012 | Goldman-Shenhar | 701/36 |
| 2014/0054880 A1 * | 2/2014 | Feinstein | 280/731 |

FOREIGN PATENT DOCUMENTS

| | | |
|---|---|---|
| DE | 60130983 T2 | 7/2008 |
| EP | 1887595 A1 | 2/2008 |
| GB | 2423646 A | 8/2006 |
| GB | 2445505 A | 7/2008 |
| GB | 2448893 A | 11/2008 |
| GB | 2450587 A | 12/2008 |
| GB | 2452714 A | 3/2009 |
| GB | 2454619 A | 5/2009 |
| GB | 2462920 A | 3/2010 |
| GB | 2465077 A | 5/2010 |
| GB | 2465713 A | 6/2010 |
| GB | 2468870 A | 9/2010 |
| GB | 2437997 B | 7/2011 |
| GB | 2443658 B | 9/2011 |
| JP | 61-146671 | 7/1986 |
| JP | 2008-059459 | 3/2008 |
| JP | 2010-026610 | 2/2010 |
| WO | 9803193 A1 | 7/1998 |
| WO | 9938173 A1 | 7/1999 |
| WO | 0079546 A1 | 12/2000 |
| WO | 0188935 A1 | 11/2001 |
| WO | 02099822 A2 | 12/2002 |
| WO | 2005029514 A1 | 3/2005 |
| WO | 2006016138 A1 | 2/2006 |
| WO | 2008135787 A1 | 11/2008 |
| WO | 2009034313 A2 | 3/2009 |
| WO | 2010023449 A1 | 3/2010 |
| WO | 2010109186 A2 | 9/2010 |

* cited by examiner

STEERING WHEEL WITH HAND PRESSURE SENSING

This application claims priority to and the benefit of U.S. Provisional Patent Application No. 61/320,588, filed Apr. 2, 2010, incorporated by reference herein in its entirety.

BACKGROUND

The present invention relates generally to the field of steering wheels. More specifically, it relates to a system for sensing the presence of a driver's hands on the steering wheel.

Conventional steering wheels do not have the capability of detecting the drivers hand position during vehicle operation. In normal driving conditions both hands should be present on the steering wheel to be in full, safe control of the vehicle, following the "hands on the wheel, eyes on the road, mind on the drive" safety mantra.

In recent times, the number of potential distractions for a driver has increased. With the advent of portable electronics (e.g., mobile phones, mp3 players, etc.), there are a number of electronic distractions that encourage or tempt drivers to take their hands of the steering wheel. For example, such portable electronics can require manually dialing or selecting a phone number in order to make a cell phone call, or manually texting messages and/or answering emails, or selecting which song to play on an attached MP3 player.

It would be desirable to provide a system for identifying the presence and/or location of a driver's hands on the steering wheel to allow for vehicle based warnings and inputs for other vehicle and steering wheel based systems.

SUMMARY

According to an embodiment, a vehicle safety system includes a steering wheel, a plurality of pressure sensitive sensors located in the steering wheel, and a control unit. The pressure sensitive sensors can be located in different regions of the steering wheel. The pressure sensitive sensors can determine if a driver's hand is pressing upon a respective region of the steering wheel associated with one or more of the plurality of pressure sensitive sensors. The control unit can be configured or programmed to determine if at least one of the driver's hands is pressing upon a region of the steering wheel for a predetermined amount of time.

According to an embodiment, a vehicle steering wheel includes a plurality of pressure sensitive sensors located in the steering wheel. The pressure sensitive sensors can be located in different regions of the steering wheel, such that the pressure sensitive sensors can determine if a driver's hand is pressing upon a respective region of the steering wheel associated with one or more of the plurality of pressure sensitive sensors.

BRIEF DESCRIPTION OF THE DRAWINGS

These and other features, aspects, and advantages of the present examples will become apparent from the following description, appended claims, and the accompanying examples shown in the drawings, which are briefly described below.

DETAILED DESCRIPTION

Figure 1:
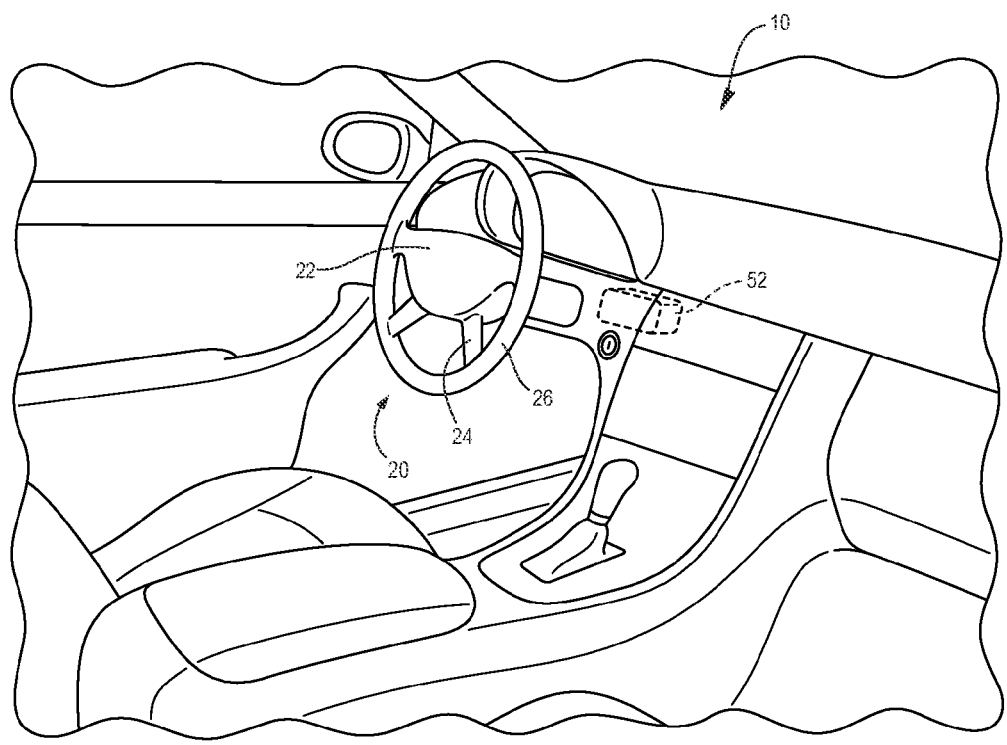
FIG. 1 is an isometric view of a vehicle interior showing a steering wheel with hand pressure sensing, according to an example.

By placing a pressure sensitive material underneath a steering wheel underlay, such as the leather/foam of a steering wheel, or incorporating a pressure sensitive material into the steering wheel underlay, it is possible to detect the number of hands on the steering wheel and where they are placed.

The steering wheel can be separated into a number of zones. For example, the steering wheel can have a four-spoke design that includes four zones—an upper rim portion, a lower rim portion, a left hand portion and a right hand portion. When pressure is detected on the steering wheel rim in one or more of the zones, such as due to a drive grasping the steering wheel with one or both of the driver's hands, a touch point can be identified. Using vehicle settings, a minimum number of touch points could be pre-set to establish a safe driving condition.

The features described herein can be part of a vehicle safety system, which can include a steering wheel, one or more pressure sensitive sensors, and a control unit. The control unit can be configured or programmed to perform the steps and features described herein, such as receiving signals from the pressure sensitive sensors, outputting information to be recorded or sent via messages, and/or providing commands to devices, such as heating devices. The control unit can be, for example, an a CPU with non-volatile memory including programming for the steps and features described herein, For example, seasoned, experienced drivers could set a control system or unit, to demand only one point of contact, whereas parents of younger, inexperienced drivers, who may be more prone to temptations with electronic devices, could set the system to demand two contact points, such as contact points on the left hand side and the right hand side of the steering wheel corresponding to contact points for each hand.

When the control unit or system is set to look for contact on the steering wheel by two hands of the driver using sensors, a time based algorithm can be used to determine the length of time when one hand is not in contact with the wheel so that the control system is not constantly raising an alarm every moment one hand is lifted from the steering wheel. Such a threshold length of time may be, for example, 1-10 seconds or 1-5 seconds or other periods of time, and can be based upon the type of transmission in the vehicle. For example, automatic transmissions could utilize a smaller threshold time period, which may be preset by the OEM, whereas for manual shift transmission (without steering wheel mounted shifters) could use a longer threshold time period may be set due to the need to use one hand to shift gears.

If such a time period for the control system is exceeded, and a hand is not detected to be in contact with the steering wheel, the system may use feedback to warn the driver and other vehicle occupants. Such feedback can be, for example, a warning sound, a warning voice, a warning light, a wheel vibration using a physical wheel-based vibration device, and other forms of feedback used in the art. Further steps may also be employed if a hand is not detected on the wheel for prolonged periods of time, such as slowing the vehicle, presetting the vehicle to log and report the instance via email to a parent or vehicle owner, or automatically turning off the radio or disconnected other electronic devices connected to the vehicle systems.

At a time leading up to deployment of an airbag, both hands should preferrably be on the steering wheel. The control unit or system can log historical data regarding the presence of the driver's hands on the steering wheel or such data may be recorded by a vehicle system, such as a restraint control module(RCM)/black box. In case of an accident, this data could be used to show the degree of control of a vehicle.

According to another example, the time period may also be related to vehicle speed and can be varied as the speed of a vehicle varies. Thus, as the vehicle speed increases, more hand contact may be required on the wheel. For example, the control system of a vehicle can be used with sensors to detect if no hands are on the steering wheel when the vehicle is in motion. In such a scenario, a control unit can impose a threshold time period before feedback is provided or action is taken in a much shorter time period, for example 1-2 seconds. If the vehicle is moving and no hands are detected after a first, initial time period, feedback may be provided to the driver, such as, for example, a warning sound or voice may be employed. After another period of time has elapsed after the feedback, more intrusive steps can be taken, such as intervening in a driving operation of a vehicle. Such a second period of time could be, for example, 1-60 seconds, 1-30 seconds, 1-20 seconds, 1-10 seconds, 1-5 seconds, or 1-2 seconds. More intrusive steps to be employed after lapse of the second period of time may include, for example, intervening in a driving operation of a vehicle. Intervening in a driving operation of a vehicle can include, for example, slowing the vehicle, activating the hazard warning lights and or horn system, and or dialing the emergency services or cell phone based service operator (for example, OnStar®) who can determine by means of conversation if all is well with the driver.

As discussed above, the time period may also be related to vehicle speed and can be varied as the speed of a vehicle varies. For example, at speeds over 50 mph fewer gear changes would be necessary, so more contact time between the driver's hands and the wheel is to be expected. Conversely, when the vehicle is stationary, no hand contact is needed at all.

The detection of no hands on the steering wheel may be taken as evidence of an impaired driver. For example, the lack of hands or only one hand on a steering wheel could be an indication of a distracted driver, a drowsy driver, a drunk driver, or a driver who is suffering from a medical episode, such as a heart attack, stroke, or seizure. Taking fast and immediate action can be of paramount importance in such situations.

In another example, hand detection information can be combined with other vehicle information, such as, for example, outputs from the steering wheel angle sensor, yaw rate and vehicle speed sensors, to determine how aggressive the driving motion is. An overly aggressive or extreme driving motion may indicate that the driver is no longer in control of the vehicle. In such situations, more intrusive steps can be taken.

In another example, a system for determining the presence and positioning of hands on the steering wheel may be employed with a heated steering wheel system. The hand contact points can be used to locally heat the steering wheel where only the hands are, allowing for a faster heat up than when heating the entire steering wheel rim. Such a system also provides a more efficient heating system by only heating those areas of a steering wheel being grasped by a driver's hands.

Separate heating loops within the heating element design can be provided for each sensing zone of a steering wheel, such as four zones of a steering wheel, as described above. All of the separate loops can pass within a heating thermostat temperature reading zone such that the temperature could be controlled by the electronic or bi-metallic heating controller. An electronic control unit or circuit can determine, based on input of whether the heated wheel was turned on and based on where the hands of a driver are located, how to prioritize electrical current to the various zones or heating loops, such as by giving higher priority to the zones which are contacted by the driver's hands. By prioritizing the heated areas or only heated those areas or zones being contacted, the amount of heatable area can be reduced and a faster heat up curve or response can be achieved by channeling the same total current into a smaller heater circuit, thus improving the heat up rate of the steering wheel in those zones where the hands of a driver are located.

FIG. 1 shows an example of an interior 10 of a vehicle cockpit, which includes a steering wheel 20. The driver may rotate the steering wheel 20 to turn the vehicle wheels and steer the vehicle in a desired direction, as is normally done when driving a vehicle. The steering wheel 20 may also include various controls, such as switches or buttons, provided within easy reach of the driver. Such controls may be for a vehicle audio system (such as for controlling volume, tuning, mode, etc.), for vehicle lighting (such as overhead lighting, headlights, etc.), for a phone, or for other controls, such as cruise control. Controls for systems such as an audio system, climate system, lighting system or other systems may also be provided elsewhere in the vehicle, such as on the vehicle dash or center console.

Figure 2A:
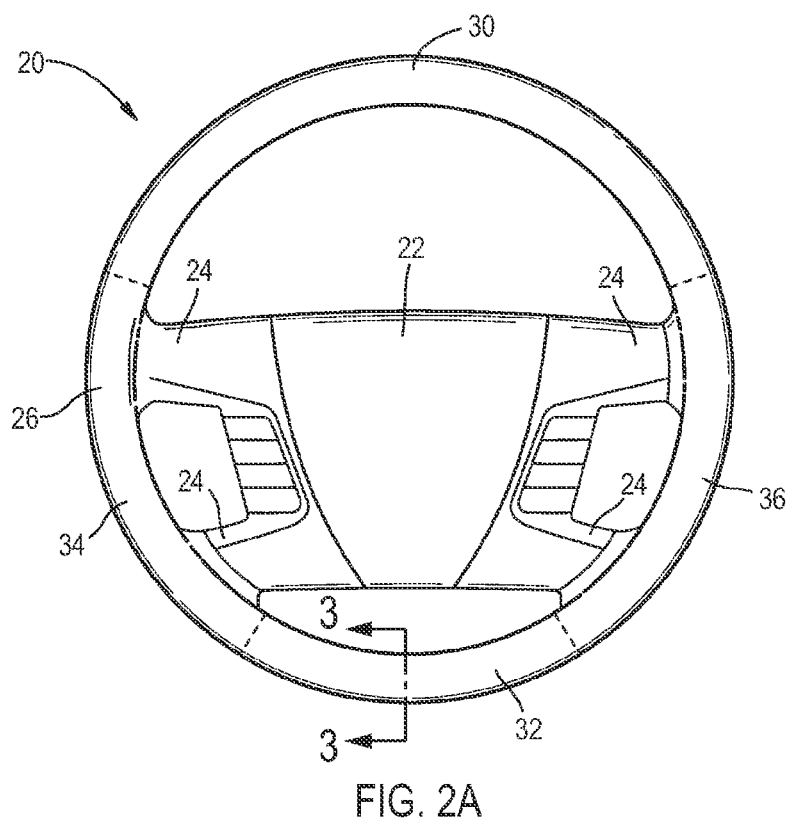
FIG. 2A is a front view of a steering wheel with hand pressure sensing, according to an example.
Figure 2B:
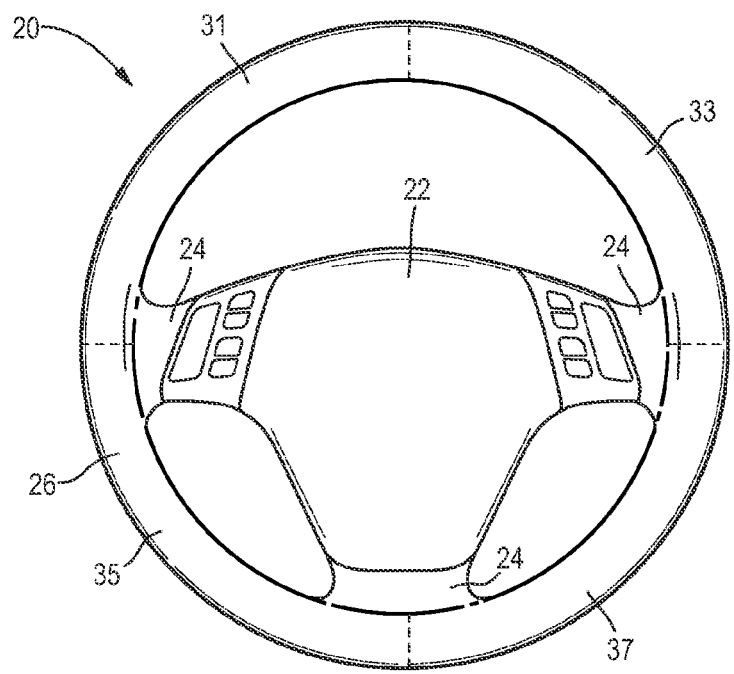
FIG. 2B is a front view of a steering wheel with hand pressure sensing, according to an example.
Figure 3:
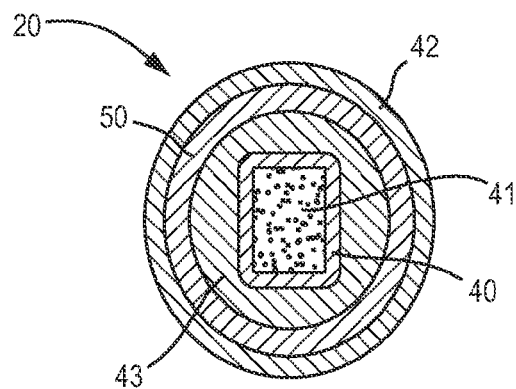
FIG. 3 is a cross section of the steering wheel of FIG. 2A taken along line 3-3.

FIG. 2A and FIG. 2B show examples of steering wheel 20s. Such steering wheels 20 can include a central hub 22 connected to an outer ring or rim 26 with one or more spokes 24. The hub 22 can be coupled to the steering column of a vehicle. A driver can turn the steering wheel 20 by grasping the outer rim 26. The steering wheel 20 may be a four-spoke steering wheel, as shown in the example of FIG. 2A. In another example, the steering wheel 20 may be a three-spoke steering wheel, as shown the example of FIG. 2B. In other examples, the steering wheel 20 may have a different number or arrangement of spokes.

The outer rim 26 of the steering wheel 20 can be divided into a number of sub-zones or regions with sensors to sense the location and presence of hands on the outer rim 26. As shown in the example of FIG. 2A, the steering wheel 20 can be divided into an upper rim portion 30, a lower rim portion 32, a left hand portion 34 and a right hand portion 36. Such portions 30, 32, 34, 36 can also be referred to as zones. While the sensing system will be discussed in general with reference to the four spoke steering wheel 20 embodiment shown in FIG. 2A, other configurations of the steering wheel 20 and sensing zones are possible. For example, the steering wheel 20 may be divided into an upper left portion 31, an upper right portion 33, a lower left portion 35, and a lower right portion 37, as shown in the example of FIG. 2B. Four zones are preferred to provide enough resolution to properly determine the location of hands on the steering wheel, such as the outer rim 26 of the steering wheel. However, in other embodiments, the steering wheel 20 may be divided into more zones to more accurately determine the location of the hands and such portions or zones can be located in areas other than the rim 26 of the steering wheel. For example, the steering wheel 20 may include sensors on other portions, such as on the spokes 24 or the hub 22. In still other examples, the steering wheel 20 may be divided into three of fewer zones to use fewer components in the steering wheel.

A steering wheel 20 can include an armature 40 formed from a relatively rigid material such as a metal (such as, for example, steel, magnesium, or aluminum, etc.), a polymer, wood, or a composite material such as a reinforced polymer (such as, for example, a fiber-reinforced polymer, a particle reinforced polymer, etc.). Such an armature 40 can be provided in the form of a frame, shell, base, or other armature form used in the art. The armature 40 can provide strength and shape to the steering wheel 20.

If the armature 40 is a hollow body, it may be filled with a sound-dampening material 41 such as a polyurethane foam or other suitable material. In addition, the armature 40 may be surrounded by another material which provides a main body 43 of the outer rim 26, such as a polymer, foam, wood, etc.

The armature 40 may be covered with a covering or skin 42 that at least partially covers the armature 40. The skin 42 can be configured to provide an aesthetically pleasing exterior for the steering wheel 20. The skin 42 can also be configured to add an ergonomically pleasing layer to the outside of the steering wheel 20 to improve the comfort of the driver. According to an example, the skin 42 may be formed from an injection molded polyurethane material. According to other examples, the skin 42 may be formed from a wide variety of other molded materials, such as olefinic thermoplastic elastomers (TEOs), thermoplastic olefins (TPOs), rubber, or any other suitable material. According to other examples, the skin 42 may be a film or sheet which is wrapped around the armature, such as leather, fabric, a polymer material. According to other examples, the skin 42 may be a shell of laminate formed from a generally rigid material such as wood, a carbon fiber composite, etc. An underlay material such as a foam may be provided under the skin 42 to further increase the ergonomic comfort of the driver. The steering wheel 20 may have further components coupled to it such as appliqués formed from materials (such as leather or wood), separate back covers, switches, bezels, etc.

Each of the steering wheel zones 30, 32, 34, and 36 can include a sensor 50. Such a sensor 50 can be, for example a pressure-sensitive material which is provided between the armature 40 (or the main body 43) and the outer skin 42. Such a pressure sensor 50 can be configured to sense the pressure caused by a hand gripping a region of the steering wheel 20 proximate to the pressure sensor 50. For example, a steering wheel 20 can include four sensors 50 arranged on the outer rim 26 about the periphery of the steering wheel 20, positioned to correspond to four zones 30, 32, 34, and 36. In other embodiments, the steering wheel 20 may include a greater or fewer number of zones and a greater or fewer number of sensors 50. Increasing the number of sensors 50 can increase the accuracy with which the location of the driver's hands on the steering wheel 20 may be sensed. While the sensors 50 are shown in the figures as being located on the outer rim 26 of the steering wheel 20, in other embodiments, to even more accurately sense the locations of the driver's hands, such sensors may be provided under the skin 42 in other locations, such as on the spokes 24 or on the hub 22.

Such pressure sensors are described in U.S. application Ser. No. 13/076,226, filed on Mar. 30, 2011, which is incorporated by reference herein in its entirety. As discussed in U.S. application Ser. No. 13/076,226, such pressure sensors may include sheets of carrier material, conductors, electrodes, and a pressure sensitive material configured in a generally symmetric, layered relationship (e.g., a carrier sheet, conductor, and electrode disposed on each side of the pressure sensitive material). The carrier sheets, conductors, electrodes, and pressure sensitive material may be selectively configured to change conductive or electrical characteristics of the sensors according to the forces expected during a dynamic impact event.

As discussed in U.S. application Ser. No. 13/076,226, such pressure sensitive material can be configured to change resistance or conductive/electrical characteristics in response to force or pressure acting thereupon. More particularly, the pressure sensitive material can behave substantially as an isolator when no force or pressure is present and decreases in resistance as more force or pressure is present. Between low and high forces, the pressure sensitive material responds to force or pressure in a predictable manner, decreasing in resistance with increasing force. The pressure sensitive material may, for example, be a carbon nanotube conductive polymer. The pressure sensitive material can be applied to one of the electrodes by a printing process, such as two- or three-dimensional ink jet or screen printing, vapor deposition, or conventional printed circuit techniques, such etching, photo-engraving, or milling. As pressure sensitive materials with smaller particle sizes are used, such as that of grapheme or a grapheme conductive polymer, the pressure sensitive material may also be applied through conventional printed circuit techniques, such as vapor deposition. According to other exemplary embodiments, the pressure sensitive material may be a silicene polymer material doped with a conductor, such as silver or copper. According to other examples, the pressure sensitive material can be a quantum tunneling composite (QTC), which is a variable resistance pressure sensitive material that employs Fowler-Nordheim tunneling. QTC is a material commercially made by Peratech (www.peratech.com), of Brompton-on-Swale, UK. The QTC material in the sensors may act as an insulator when zero pressure or zero force is applied, since the conductive particles may be too far apart to conduct, but as pressure (or force) is applied, the conductive particles move closer to other conductive particles, so that electrons can pass through the insulator layer changing the insulator layer changing the resistance of the sensor. Thus, the resistance of the QTC in the sensors is a function of the force or pressure acting upon the sensor.

A pressure sensitive material can be desirable as a sensor 50 to determine the location of hands on a steering wheel 20 because it can be concealed under the skin 42, and therefore not interfere with the aesthetic or ergonomic function of the skin 42. Further, a pressure sensor 50 is able to sense the presence of a hand on the steering wheel 20 even if the driver's hands are covered with clothing such as gloves, which could interfere with another type of sensor such as a capacitance sensor.

The skin 42 may be a relatively tight film or material that impart an inward force on the outer rim 26. This initial force caused by the tension of the skin 42 may be compensated for and the system may be calibrated or zeroed to ignore this force and only sense the pressure caused by the hands of the driver.

Determining the presence and location of the driver's hands on the steering wheel can be used to monitor driving habits and provide feedback or warnings to the driver. The sensors 50 may be coupled to a control unit or processing system 52, as shown in the example of FIG. 1, which can receive data from the sensors 50 and activate other visual, audio, or other functional signals or feedback mechanisms.

Figure 4:
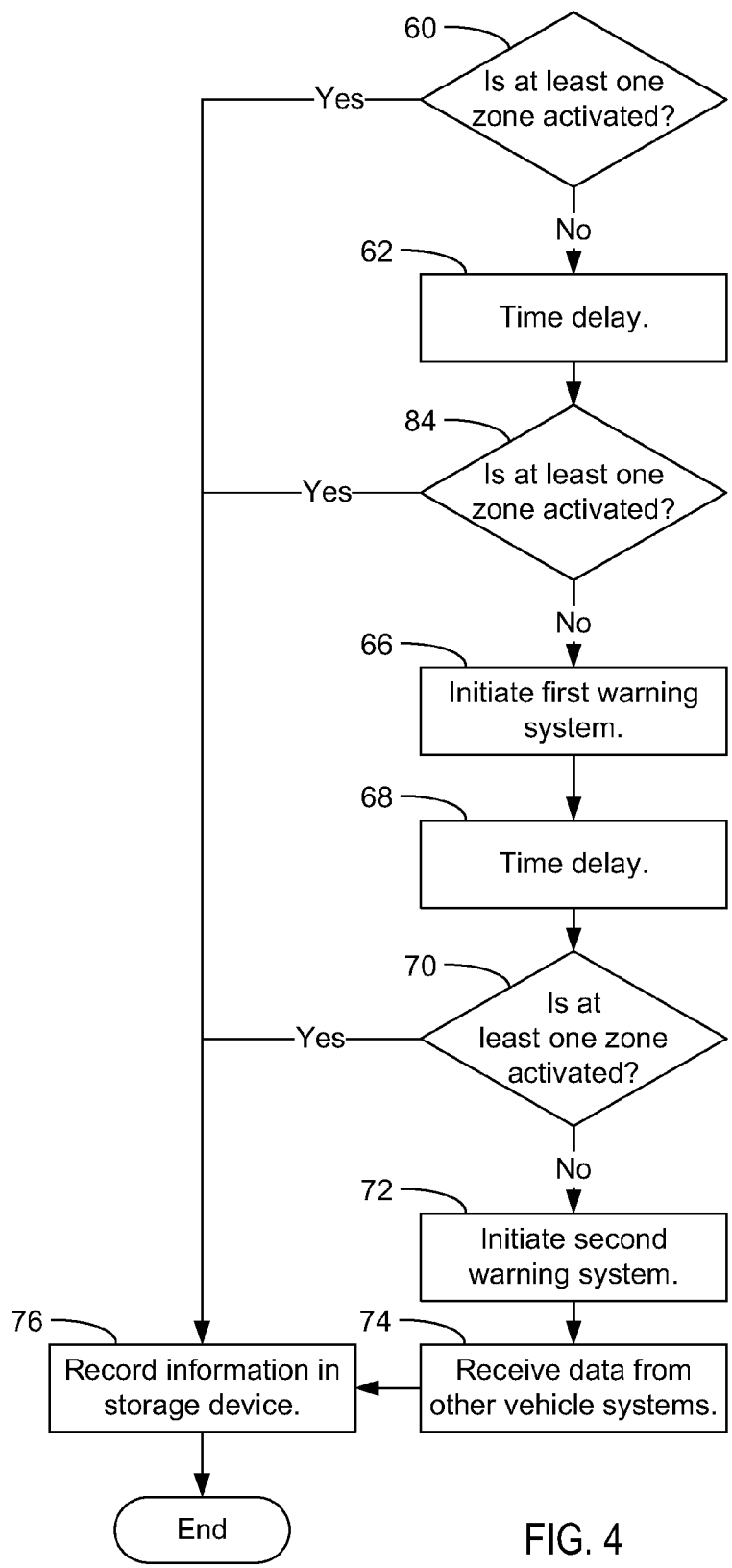
FIG. 4 is a flowchart of a method for monitoring a steering wheel with pressure sensors, according to an example.
Figure 5:
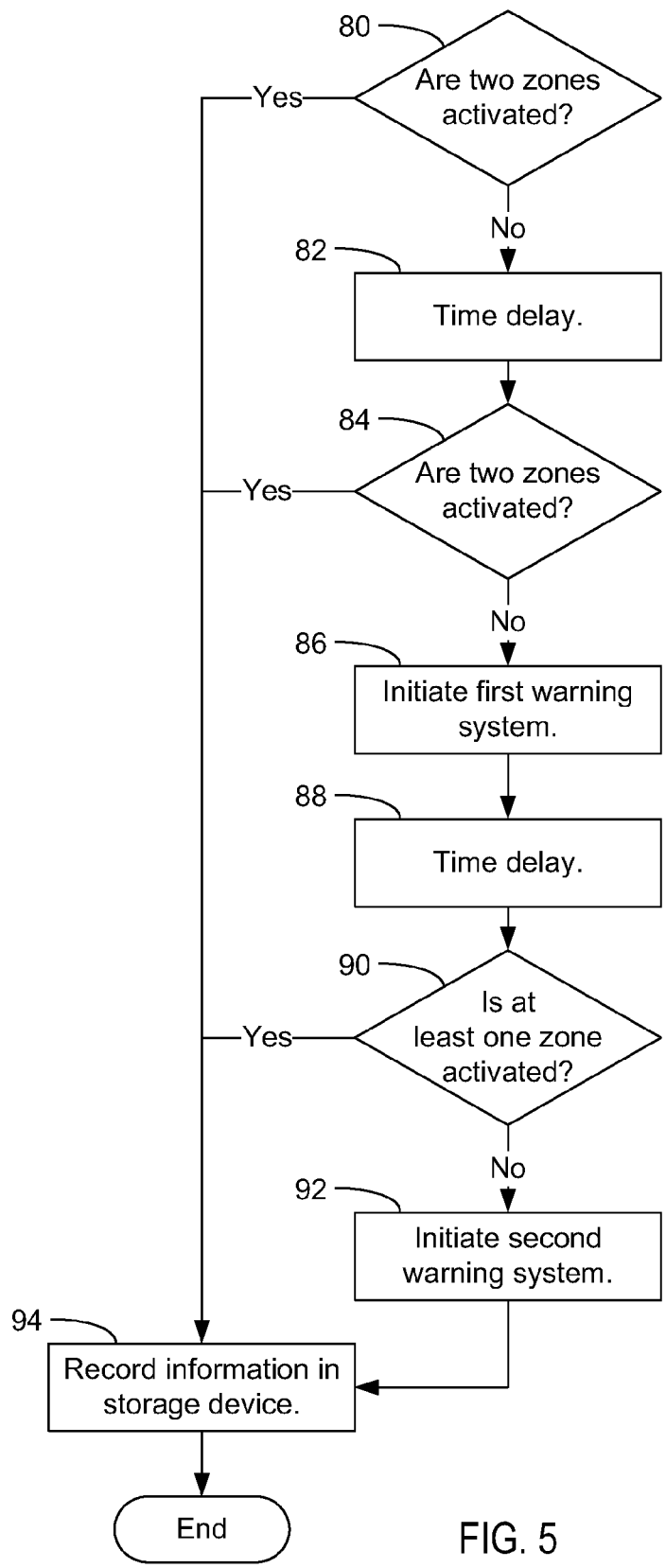
FIG. 5 is a flowchart of a method for monitoring a steering wheel with pressure sensors, according to an example.

FIG. 4 and FIG. 5 shows examples of flowcharts for methods of monitoring the presence and location of hands on a steering wheel. The steps performed in the examples of FIG.

4 and FIG. 5 can be carried out by a control unit in the vehicle, such as a CPU with a non-volatile memory having programming including the steps described herein. Such a control unit can be included in a vehicle safety system. Systems using these exemplary methods can be preset to require either one or two hands on the steering wheel 20. For example, the system may be set to require one point of contact for experienced drivers (although two is still preferable), whereas the system may be set to require two points of contact for younger or inexperienced drivers.

FIG. 4 shows an example of a flowchart for a method of monitoring the presence and location of hands on the steering wheel, with the system being set to require one hand on the steering wheel. In step 60 the sensors are checked to determine if at least one zone is activated. If a zone is not activated, a time delay is begun in step 62. Such a time delay can be relatively short (such as for example, 1-5 seconds, 1-2 seconds, 2 seconds, or 1 second), as the driver has minimal control of the vehicle when there are no hands on the steering wheel. At the end of the time delay in step 62, the output of the sensors is checked again to determine if one of the zones is activated in step 84. If the driver has not placed a hand on the steering wheel when the initial time delay expires, a first warning system is initiated in step 66.

The warning system may use various methods to prompt the driver to place two hands on the steering wheel, such as, for example, a warning sound, a warning voice, vibrating the wheel using a physical wheel-based vibration device, etc. In step 68 a second time delay may begin while the first warning system is activated. The second time delay may also be relatively short, such as, for example, 1-5 seconds, 1-2 seconds, 2 seconds, or 1 second. At the end of the second time delay in step 70, the output of the sensors is checked again to determine if at least one zone has been activated. If this check in step 70 fails, representing a prolonged period of time in which the driver has no hands on the steering wheel, a second warning system may be initiated in step 72, which may include intervening in a driving operation of a vehicle.

The second warning system may take more drastic steps than the first warning system, such as, intervening in a driving operation of a vehicle, which can include slowing the vehicle for a prolonged period, sounding the vehicle horn, or dialing emergency services or a mobile phone-based service operator. An operator or emergency personal can communicate with a driver in such a situation to determine if the driver is undergoing a medical or other emergency. In step 74, data from other vehicle sensors, such as outputs from the steering wheel angle sensor, yaw rate and vehicle speed sensors, etc. may be collected. Such additional data may be used to determine how aggressive the driving motion is. An overly aggressive or extreme driving motion may indicate that the driver is no longer in control of the vehicle. In such situations, more intrusive steps can be taken such as turning off the vehicle engine. In step 76, the data from the system may be recorded in a storage device such as a restraint control module(RCM)/ or "black box." After the check is completed, the process may repeat to continually monitor the driver, such as by returning to step 60.

FIG. 5 shows an example of a flowchart for a method of monitoring the presence and location of hands on the steering wheel, with the system being set to require two hands on the steering wheel. In step 80, the system may be configured to first check if at least one hand is on the steering wheel, as described in reference to FIG. 4. If at least one hand is on the steering wheel, the sensors are checked to determine if two of the zones are activated. If two zones are not activated, an initial time delay commences in step 82. The time delay may be set by a user or vehicle owner (such as a parent) or may be determined automatically using different criteria, such as the speed of the vehicle, the type of transmission, the terrain, the type of road, etc.

At the end of the initial time delay in step 84, the output of the sensors can be checked again to determine if two of the zones are activated. If the driver has not placed two hands on the steering wheel when the initial time delay expires, a first warning system can be initiated in step 86. The warning system may use various methods to prompt the driver to place two hands on the steering wheel, such as a warning sound, a warning voice, vibrating the wheel using a physical wheel-based vibration device, etc. In step 88, a second time delay may begin while the first warning system is activated. At the end of the second time delay in step 90, the output of the sensors are checked again to determine if two of the zones are activated. If this check fails, representing a prolonged period of time in which two hands are not placed on the steering wheel, a second warning system may be initiated in step 92. The second warning system may take more drastic steps than the first warning system, such as slowing the vehicle for a prolonged period, automatically turning off the radio, or logging vehicle data and reporting the instance via email to a parent. In step 94 the data from the system may be recorded in a storage device such as a restraint control module(RCM)/or "black box." After the check is completed, the process may repeat to continually monitor the driver.

The sensors 50 and control systems described herein may also be used in combination with a steering wheel heating system 100. For example, the sensors 50 can allow the heating system 100 to determine the positioning of the driver's hands and locally heat up only the portions of the steering wheel rim 26 proximate to the driver's hands, such as by heating only those regions or zones where the driver's hands are in contact with the steering wheel or prioritizing electricity to those zones contacted by the driver's hands.

Figure 6:
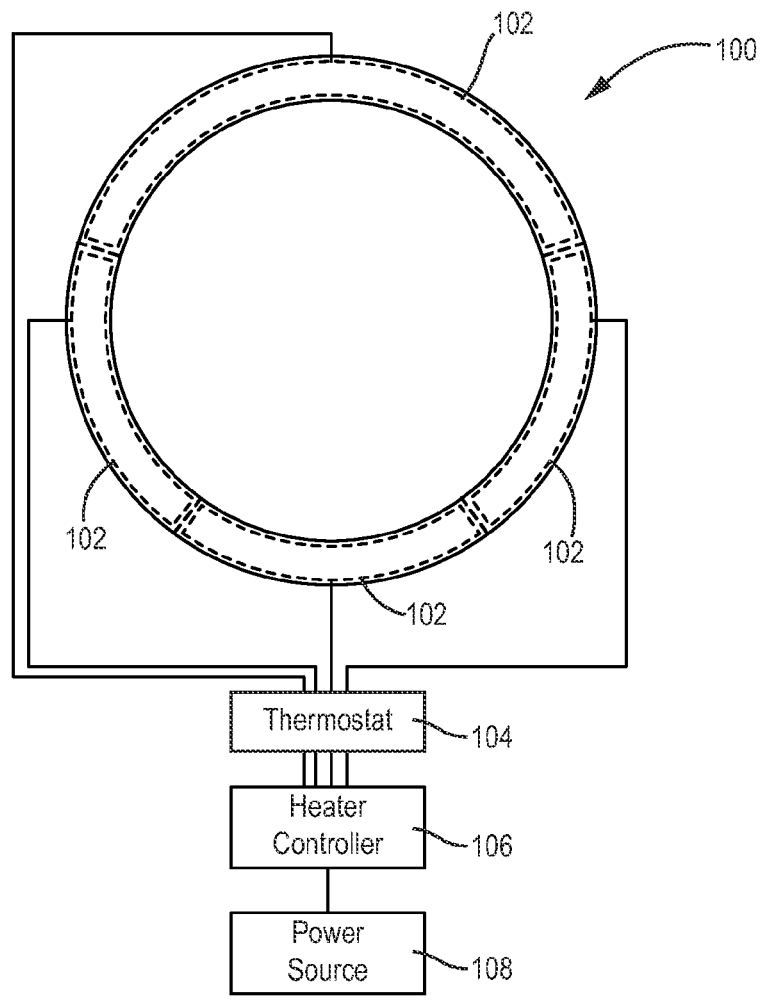
FIG. 6 is a block diagram of a heating system for a steering wheel with hand pressure sensing, according to an example.

As shown in the example of FIG. 6, a heating system 100 can include multiple heating loops or zones 102 on the rim 26. Each loop 102 corresponds to one of the sensor zones (such as zones 30, 32, 34, 36 shown in the example of FIG. 2A) of the steering wheel 20. The number and arrangement of the heating loops 102 may vary depending on the number and arrangement of the sensor zones. Each of the separate loops 102 can be coupled to a thermostat 104. The temperatures of the individual loops 102 can be controlled by a heating controller 106 (such as a electronic or bi-metallic controller) drawing power from a power source 108, such as the electrical system of a vehicle. The controller 106 can use an electronic circuit or control unit to determine the heat to apply to the loops 102 based on the status of the heating system 100 (e.g., if it is turned on or off) and the positions of the driver's hands on the outer rim 26 as determined by the sensors 50.

By determining the position of the driver's hands, the heating system 100 can be heat up only the portions of the rim 26 where the driver's hands are located or heat those portions nearby. By reducing the amount of heatable area, a faster heat up curve or response can be achieved by channeling the same total current into a smaller heater circuit, thus improving the heat up rate of the steering wheel in the zones where the hands are located.

While the system is described above as using a pressure sensitive material to measuring contact of one ore two hands on the steering wheel, in other embodiments, different sensing means may be used. For example, the presence and positioning of hands on the steering wheel may be detected with capacitance or resistance-based sensors, as discussed above.

While the system is described above as having a multitude of discrete sensors that define a multitude of zones around the steering wheel, according to another exemplary embodiment, the steering wheel 20 may include a single sensor 50 (e.g., disposed below the skin 42) that extends along the entire outer rim 26. The sensor 50 may be configured to be able to sense the location of multiple contact points. The processing system 52 may, in turn, be configured to interpret the signals from the sensor 50 to determine the presence and location of one or two hands on the steering wheel 20.

The sensor 50 may be configured to provide a binary signal to the processing system 52 (e.g., hands on or hands off) or may be able to provide an analog signal to the processing system 52 that describes the amount of pressure applied to the steering wheel 20, the rate of change of the pressure on the steering wheel, etc. If the sensor 50 provides an analog signal, the processing system 52 may be configured to react differently to, for example, a signal indicating that the pressure on the steering dropped quickly compared to a signal indicating that the pressure on the steering wheel dropped slowly. A quickly dropping pressure at one of the contact points may be interpreted to indicate that a hand was removed relatively quickly from the steering wheel 20 in a deliberate motion (e.g., to answer a mobile phone, to change a radio station, to shift gears, etc.). A slowly dropping pressure at one or two contact points, by contrast, may be interpreted to indicate that a hand was removed from the steering wheel slowly, which may be due to a drowsy driver, an inebriated driver, a driver suffering a medical episode, etc. The processing system 52 may be configured to then initiate a different warning response based on the speed with which a hand was removed from the steering wheel if the duration exceeds a predetermined limit.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the pressure sensing system for a steering wheel as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present embodiments.

What is claimed is:

1. A vehicle safety system, comprising:
    a steering wheel,
    a plurality of pressure sensitive sensors located within an outer surface of a rim of the steering wheel,
    wherein the pressure sensitive sensors are located in different regions of the steering wheel, the pressure sensitive sensors configured to detect a pressure applied to one or more of the plurality of pressure sensitive sensors indicative of a presence of a driver's hand upon a respective region of the steering wheel, and
    a control unit configured to:
        initiate a first warning system in response to determining that at least one of the driver's hands has not pressed upon a region of the steering wheel for a first predetermined amount of time,
        initiate a second warning system in response to determining that at least one of the driver's hands has not pressed upon a region of the steering wheel for a second predetermined amount of time, and
        determine a rate of change of pressure applied to one or more of the plurality of pressure sensitive sensors wherein the initiating of at least one of the first or second warning systems is based on the rate of change of pressure applied to one or more of the plurality of pressure sensitive sensors.

2. The vehicle safety system of claim 1, wherein the control unit is configured to determine if both of the driver's hands are pressing upon regions of the steering wheel.

3. The vehicle safety system of claim 2, wherein the control unit is configured to determine if the driver's hands are pressing upon different regions of the steering wheel associated with different pressure sensitive sensors.

4. The vehicle safety system of claim 1, wherein the second warning system includes causing at least a portion of the vehicle to intervene in a driving operation of the vehicle.

5. The vehicle safety system of claim 1, further comprising a heating device configured to heat the different regions of the steering wheel.

6. The vehicle safety system of claim 5, wherein the control unit is configured to activate the heating device to heat only a respective region which corresponds to a pressure sensitive sensor detecting that a driver's hand is pressing upon the same respective region.

7. The vehicle safety system of claim 1, wherein the rim of the steering wheel comprises an armature formed from a rigid material and a skin covering at least a portion of the armature, the pressure sensitive sensors being arranged between the armature and the skin.

8. The vehicle safety system of claim 1, wherein the first warning system includes an audible alarm.

9. A vehicle safety system, comprising:
a steering wheel,
a plurality of pressure sensitive sensors located within an outer surface of a rim of the steering wheel,
wherein the pressure sensitive sensors are located in different regions of the steering wheel, the pressure sensitive sensors configured to detect a presence of a driver's hand upon a respective region of the steering wheel associated with one or more of the plurality of pressure sensitive sensors, and
a control unit configured to:
initiate a first warning system in response to determining that both of the driver's hands have not pressed upon a region of the steering wheel for a first predetermined amount of time, and
determine a rate of change of pressure applied to one or more of the plurality of pressure sensitive sensors, wherein the initiating of the first warning system is based on the rate of change of pressure applied to one or more of the plurality of pressure sensitive sensor.

10. The vehicle safety system of claim 9, wherein the control unit is configured to determine if both of the driver's hands are pressing upon regions of the steering wheel.

11. The vehicle safety system of claim 10, wherein the control unit is configured to determine if the driver's hands are pressing upon different regions of the steering wheel associated with different pressure sensitive sensors.

12. The vehicle safety system of claim 9, wherein the control unit is further configured to initiate a second warning system in response to determining that at least one of the driver's hands has not pressed upon a region of the steering wheel for a second predetermined amount of time, wherein the second warning system includes causing at least a portion of the vehicle to intervene in a driving operation of the vehicle.

13. The vehicle safety system of claim 9, further comprising a heating device configured to heat the different regions of the steering wheel.

14. The vehicle safety system of claim 13, wherein the control unit is configured to activate the heating device to heat only a respective region which corresponds to a pressure sensitive sensor detecting that a driver's hand is pressing upon the same respective region.

15. The vehicle safety system of claim 9, wherein the rim of the steering wheel comprises an armature formed from a rigid material and a skin covering at least a portion of the armature, the pressure sensitive sensors being arranged between the armature and the skin.

16. The vehicle safety system of claim 9, wherein the first warning system includes an audible alarm.

\* \* \* \* \*